(12) United States Patent
Schwab

(10) Patent No.: US 10,871,013 B2
(45) Date of Patent: Dec. 22, 2020

(54) LOAD TRANSFER INTERFACE FOR A VEHICLE DOOR, IN PARTICULAR FOR AN AIRCRAFT CABIN DOOR

(71) Applicant: AIRBUS HELICOPTERS DEUTSCHLAND GMBH, Donauworth (DE)

(72) Inventor: Matthias Schwab, Genderkingen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 717 days.

(21) Appl. No.: 15/647,477

(22) Filed: Jul. 12, 2017

(65) Prior Publication Data

US 2018/0030762 A1 Feb. 1, 2018

(30) Foreign Application Priority Data

Jul. 29, 2016 (EP) .................................... 16400033

(51) Int. Cl.
*B64C 1/14* (2006.01)
*E05B 83/36* (2014.01)
(Continued)

(52) U.S. Cl.
CPC ............ *E05B 85/24* (2013.01); *B64C 1/1407* (2013.01); *B64C 1/1423* (2013.01); *E05B 79/12* (2013.01);
(Continued)

(58) Field of Classification Search
CPC ....... B64C 1/1423; E05B 85/26; E05B 79/14; E05Y 2900/502
See application file for complete search history.

(56) References Cited

U.S. PATENT DOCUMENTS 2,460,961 A * 2/1949 Wilson ...................... E05C 9/06
292/48
2,511,267 A * 6/1950 Jacob ...................... E05C 9/063
114/117
(Continued)

FOREIGN PATENT DOCUMENTS

DE 749543 11/1944
EP 0188825 7/1986
(Continued)

OTHER PUBLICATIONS

European Search Report for European Application No. EP 16400033, Completed by the European Patent Office dated Jan. 3, 2017, 5 Pages.
(Continued)

*Primary Examiner* — Brian M O'Hara
(74) *Attorney, Agent, or Firm* — Brooks Kushman P.C.

(57) ABSTRACT

A load transfer interface for a vehicle door that comprises an outer skin and at least one beam that is connected to the outer skin, wherein the outer skin and the at least one beam define a vehicle door plane, the load transfer interface comprising at least one door stop fitting that is provided to transfer pressure loads from the vehicle door to an associated vehicle structural frame, the at least one door stop fitting being provided for rotation in an associated rotation plane, wherein the associated rotation plane is at least approximately parallel to the vehicle door plane. The invention is further related to an aircraft cabin door having such a load transfer interface, as well as to an aircraft having such an aircraft cabin door.

20 Claims, 6 Drawing Sheets

(51) Int. Cl.
  *E05B 85/24* (2014.01)
  *E05B 79/12* (2014.01)
(52) U.S. Cl.
  CPC ......... *E05B 83/36* (2013.01); *E05Y 2900/502* (2013.01)

(56) References Cited

U.S. PATENT DOCUMENTS

| | | | |
|---|---|---|---|
| 3,362,573 A * | 1/1968 | Wales, Jr. | F16J 13/06 220/326 |
| 3,704,845 A | 12/1972 | Ord | |
| 3,791,073 A | 2/1974 | Baker | |
| 4,375,876 A | 3/1983 | Stewart | |
| 4,512,539 A | 4/1985 | Ackermann et al. | |
| 4,720,065 A * | 1/1988 | Hamatani | B64C 1/1407 244/129.5 |
| 4,758,030 A | 7/1988 | Kupfernagel | |
| 5,156,359 A | 10/1992 | Noble et al. | |
| 5,255,876 A | 10/1993 | Fleming | |
| 5,289,615 A | 3/1994 | Banks et al. | |
| 5,305,969 A | 4/1994 | Odell et al. | |
| 5,333,920 A * | 8/1994 | de Rover | B63B 43/32 292/48 |
| 5,379,971 A | 1/1995 | Kim et al. | |
| 6,101,764 A * | 8/2000 | Guy-Paul | B63B 43/32 292/196 |
| 6,378,806 B1 | 4/2002 | Erben | |
| 2002/0000493 A1 | 1/2002 | Erben et al. | |
| 2004/0144894 A1 | 7/2004 | Paradis | |
| 2010/0096505 A1 | 4/2010 | De Freitas et al. | |
| 2010/0109346 A1 | 5/2010 | Dieling et al. | |
| 2015/0033634 A1 | 2/2015 | Cuddy et al. | |

FOREIGN PATENT DOCUMENTS

| | | |
|---|---|---|
| EP | 0222160 | 5/1987 |
| EP | 0317037 | 5/1989 |
| EP | 0512588 | 11/1992 |
| EP | 0518429 | 12/1992 |
| EP | 0 552 505 A1 | 7/1993 |
| EP | 0 911 469 A1 | 4/1994 |
| EP | 1053934 | 11/2000 |
| EP | 2554471 | 2/2013 |
| EP | 2554472 | 2/2013 |
| FR | 2450339 | 9/1980 |
| WO | 853486 | 8/1985 |
| WO | 9819908 | 5/1998 |
| WO | 03029585 A2 | 4/2003 |
| WO | 03029585 A3 | 4/2003 |
| WO | 20008058522 | 5/2008 |
| WO | 2009059808 | 5/2009 |
| WO | 2009112936 | 9/2009 |

OTHER PUBLICATIONS

Electronic Code of Federal Regulations, Chapter I, Subchapter C, Part 25, Subpart D §25.807, Title 14: Aeronautics and Space, Part 25—Airworthiness Standards: Transport Category Airplanes, Subpart D—Design and Construction, 3 Pages, Dated Feb. 24, 2017.
European Office Action dated Feb. 22, 2019, Application No. 16 400 033.3-1010, Applicant Airbus Helicopters Deutschland GmbH, 4 Pages.

* cited by examiner

LOAD TRANSFER INTERFACE FOR A VEHICLE DOOR, IN PARTICULAR FOR AN AIRCRAFT CABIN DOOR

CROSS-REFERENCE TO RELATED APPLICATIONS

This application claims priority to European patent application No. EP 16400033.3 filed on Jul. 29, 2016, the disclosure of which is incorporated in its entirety by reference herein.

BACKGROUND OF THE INVENTION

(1) Field of the Invention

The invention is related to a load transfer interface for a vehicle door that comprises an outer skin and at least one beam that is connected to the outer skin, wherein the outer skin and the at least one beam define a vehicle door plane, wherein at least one door stop fitting is provided to transfer pressure loads from the vehicle door to an associated vehicle structural frame. The invention is further related to an aircraft cabin door with such a load transfer interface. The invention is further related to an aircraft having an aircraft cabin door with such a load transfer interface.

(2) Description of Related Art

In general, aircraft cabin doors fulfil the following major functions: They provide access for passengers and crew members to an aircraft cabin of an aircraft and allow evacuation of the aircraft cabin in an emergency case. Additionally, the aircraft cabin doors also carry, unfold and inflate slides used to evacuate the passengers from the aircraft in case of an emergency. Furthermore, for pressurized aircraft cabins the aircraft cabin doors also have to close a respective door cut out of the aircraft's fuselage in a fluid-tight manner up to a predefined maximum differential pressure load.

The standard EASA CS25.807 (corresponding to e-CFR25.807—see: http://www.ecfr.gov/cgi-bin/text-idx?SID=61ab995b2b00f05076) distinguishes between different types of emergency exits for passenger aircrafts with regard to an underlying capacity of passengers. For type A doors a maximum of 110 passengers is allowed and for type B doors a maximum of 75 passengers is allowed (FAR 25.807). Within a given evacuation time of 90 seconds passengers and crew members must be able to leave the aircraft. For this purpose, aircraft cabin doors are usually designed such that opening of a given aircraft cabin door—including inflation of an associated slide—is performed in at most 10 seconds.

In one known type of aircraft cabin doors, a basic opening motion for opening of a given aircraft cabin door is split into two phases with two different movement types: a first phase consisting in a lifting movement that is mainly directed in vertical direction, and a second phase consisting in a swivel motion in the form of a horizontal rotation. Therein, the lifting movement is required to unblock, i. e. release the aircraft cabin door from a blocked state so that the swivel motion for actually opening the aircraft cabin door can be performed.

More specifically, in the blocked state a given aircraft cabin door is usually retained at an associated aircraft fuselage structure of a given aircraft by means of suitable stop fittings that are rigidly and fixedly mounted to the given aircraft cabin door. These suitable stop fittings are part of an underlying load transfer interface that is configured for transferring pressure loads via the suitable stop fittings from the aircraft cabin door to the aircraft fuselage structure of the given aircraft. Furthermore, the suitable stop fittings can be provided as adjustable parts for compensating e. g. manufacturing tolerances in the blocked state of the given aircraft cabin door.

In another known type of aircraft cabin doors, a basic opening motion for opening of a given aircraft cabin door is performed by means of only a single movement type, i. e. either by a lifting movement or by a swivel motion. Respective aircraft cabin doors are, however, likewise implemented with suitable stop fittings that are rigidly and fixedly mounted to the given aircraft cabin door for defining corresponding load transfer interfaces. However, it should be noted that with this type of aircraft cabin doors the basic opening motion can still be performed in two phases, e. g. in a first phase a swivel motion in an initial swivel direction is performed for unblocking the aircraft cabin door in blocked state, and in a second phase a second swivel motion in an opposed swivel direction is performed for actually opening the aircraft cabin door.

Exemplary aircraft cabin doors respectively load transfer interfaces of the above-described types are e. g. described in the documents EP2554471, EP2554472, US2010096505, US2010109346, EP2254789, WO2008058522, and EP1053934. Other exemplary aircraft cabin doors respectively load transfer interfaces of the above-described types are e. g. described in the documents US20150033634, U.S. Pat. Nos. 5,379,971, 5,255,876, 5,289,615, 5,305,969, EP0518429, EP0512588, EP0317037, EP0188825, EP0172168, U.S. Pat. Nos. 4,512,539, 4,375,876, FR2450339 and U.S. Pat. No. 3,791,073, wherein at least partly comparatively complex aircraft cabin doors with several moveable parts are described.

However, as described above, use of the rigidly and fixedly mounted stop fittings usually requires implementation of a complex path of door movement for opening/closing. Accordingly, an underlying mechanism inside the aircraft cabin door needs a high complexity to realize the door movement and any further required function of the aircraft cabin door. This complexity results in corresponding costs and weight as well as problems for sizing of some parts due to respective requirements. More specifically, underlying kinematics need to be complex including some weight compensation, a given sealing needs to be capable of complex closing movements and if a gap is given between the aircraft cabin door and a respective fuselage skin when the door is being closed, this needs to be covered regarding aerodynamic impact.

In contrast to the known aircraft cabin doors, cargo doors of aircrafts use a combination of a fixed hinge and rotatable hooks to transfer pressure loads between a given cargo door and an associated aircraft fuselage. Exemplary cargo doors are described n the documents EP0222160, US2002000493 and EP2212192.

However, for aircraft cabin doors this concept is problematic, as an underlying cargo door opening movement usually requires comparatively much free space in front of a given cargo door when opening the latter. Additionally, actuators would be needed to open/close the given cargo door. As a consequence, passenger safety could be jeopardized in case of an emergency, if cargo door concepts are applied to aircraft cabin doors. The document WO03029585 describes a latching mechanism which operates in response to a pressure differential between a first side and a second side of a barrier, to allow a panel associated with the barrier to release upon given pressure conditions. Such a panel is used in a pressurized cabin of an aircraft. A latching device is positioned at a hinge to prevent movement of the panel relative to a frame. A moment arm is created by a force on the panel relative to the hinge to prevent overriding the latching device. A dead bolt assembly includes a dead bolt arm pivotally retained in the mechanism. A manual actuator is attached to a plunger and allows for manual activation of the dead bolt even when pressures are approximately equal.

The document US2004144894 describes a locking mechanism for an aircraft door 10. A first lever is connected at one end to a shaft. At its other end, a pivot pin is connected to a second lever. The second and a third levers are connected by a pivot connection. The third lever is connected to a fourth lever by another pivot connection. The fourth lever is connected to a central actuator by a further pivot connection. A T-handle fits within a recess and forms an exterior handle for the locking mechanism. Also, an inner handle is provided.

The document DE749543 describes a spring less locking device for manually operable shutters, in aircrafts. A twin-armed locking lever is mounted in a housing, flush with a supporting panel. A locking bolt is pivoted about a hinge into a closing position. When the shutter is closed, a latch bolt is moved by the lever. A hook-shaped locking bolt and a closing lever are always in the closed position when the folding catch is moved out. At least two lugs are provided on the fall bolt head, on which tie rods are braced with their free ends on rotary bearings. The rotary bearings are rotatably mounted between the hinge and closure in the vicinity of the flap edge. The rotary heads have a drop-shaped head with a helical bevel.

The document WO9819908 describes systems 10 for facilitating emergency egress from disabled aircraft. The emergency egress system is within a cockpit and includes an egress panel formed by a cockpit window supported by a panel frame. A plurality of retention devices alternately retain or decouple the egress panel with respect to panel frame. A cam means is operated to disengage a portion of a weather strip, and an actuation means sequentially disengages at least one of the retention devices. The actuation means is combined with the egress panel, the interactive retention device and the cam means. The interactive retention device includes a latch member disposed in pivotal combination with the egress panel, and a retention fitting disposed in combination with the panel frame.

The document U.S. Pat. No. 3,704,845 describes a fuselage with a cockpit. A passenger compartment is separated from the cockpit by a bulkhead. The bulkhead includes a doorway closed by a door. The door is pivotable about a hinge. A handle and latch devices are provided for securing the door in its closed position. The latches are operable only from the cockpit.

The following documents were also considered: US20100096505, WO200959808, U.S. Pat. No. 4,758,030, US20150033634 and U.S. Pat. No. 5,156,359.

BRIEF SUMMARY OF THE INVENTION

It is, therefore, an object of the present invention to provide a new load transfer interface for an aircraft cabin door and, more generally, for a vehicle door, which is capable of transferring comparatively high pressure loads, while simplifying underlying kinematics and actuation movement concepts. Furthermore, it is an object of the present invention to provide a new aircraft cabin door having such a load transfer interface, as well as a new aircraft having such an aircraft cabin door.

This object is solved by a load transfer interface for a vehicle door, said load transfer interface comprising the features of claim 1. The object is further solved by an aircraft cabin door comprising the features of claim 14, as well as an aircraft comprising the features of claim 15.

More specifically, according to the invention a load transfer interface for a vehicle door that comprises an outer skin and at least one beam that is connected to the outer skin, wherein the outer skin and the at least one beam define a vehicle door plane, comprises at least one door stop fitting that is provided to transfer pressure loads from the vehicle door to an associated vehicle structural frame. The at least one door stop fitting is provided for rotation in an associated rotation plane, wherein the associated rotation plane is at least approximately parallel to the vehicle door plane.

Advantageously, use of rotatable door stop fittings allows provision of a vehicle door that can be opened and closed by means of only a single movement type in one phase, while providing for safety and reliability as required e. g. for aircraft cabin doors. Furthermore, a rotatable fixation of the at least one door stop fitting, in particular for aircraft cabin doors, which includes a suitable control of stop motion allows rigging as used and is capable of transferring high interface loads. More specifically, the rotatable fixation of the at least one door stop fitting simplifies respective door opening movements significantly and, consequently, improves linked weight and cost issues, as well as relaxing physical boundaries for an underlying aircraft cabin door design. In particular, no weight compensation is needed.

Furthermore, a respective attachment of hinges as well as kinematics for a respective emergency opening device is simplified, as no more vertical door movement has to be considered. Moreover, use of a conventional cover plate can be omitted as a respective door skin can fully close an associated door cutout at a corresponding fuselage skin. Additionally, a required door seal can be simplified to a uniform profile at all locations. Consequently, a significant impact of weight compensation, cover plate and door seal on handle forces is no more given.

Advantageously, the rotatable fixation of the at least one door stop fitting, in particular for aircraft cabin doors, is more fiber design friendly, i. e. allows an advanced use of composite parts. In particular, a respective bearing provided at the at least one beam, such as e. g. a lug, can be realized with fibers oriented according to an applied load in contrast to a conventional T-pull design of the at least one beam for fixed mounted stop fittings, wherein highest loads usually occur in an area where correspondingly applied fibers are most sensitive due to their change of direction.

According to a preferred embodiment, the at least one door stop fitting comprises a rotating arm that defines a rotation axis of the at least one door stop fitting, the rotation axis being at least approximately perpendicular to the vehicle door plane.

According to a further preferred embodiment, the rotating arm is mounted to the at least one beam by means of at least one bearing that is adapted to allow rotation of the rotating arm around the rotation axis.

According to a further preferred embodiment, the at least one bearing comprises a first bearing that is mounted to the at least one beam by means of an associated lug bracket, the associated lug bracket retaining the first bearing at the at least one beam.

According to a further preferred embodiment, the associated lug bracket is detachably mounted to the at least one beam by means of at least one associated fastener.

According to a further preferred embodiment, the at least one bearing comprises a second bearing that is accommodated in a longitudinal beam extension of the at least one beam.

According to a further preferred embodiment, the at least one bearing is a slide bearing.

According to a further preferred embodiment, the rotating arm is connected to at least one actuating lever that is provided for rotating the rotating arm between associated open and close positions.

According to a further preferred embodiment, the at least one actuating lever is connected to at least one mechanical linkage that is actuatable via an associated handle.

According to a further preferred embodiment, the rotating arm is provided with an adjustment member that is adapted for adjusting a longitudinal extension of the rotating arm.

According to a further preferred embodiment, the adjustment member is connected to the at least one beam via an associated washer.

According to a further preferred embodiment, a filler is provided for filling out space in the at least one beam adjacent to the adjustment member.

According to a further preferred embodiment, the at least one door stop fitting comprises a stopper that is adapted to be pressed against an associated contra-stop fitting provided on the vehicle structural frame to which the vehicle door is mountable.

The present invention further provides an aircraft cabin door with an outer skin and at least one beam that is connected to the outer skin, the outer skin and the at least one beam defining an aircraft door plane, wherein the aircraft cabin door comprises a load transfer interface with at least one door stop fitting that is provided to transfer pressure loads from the aircraft cabin door to an associated aircraft fuselage structure. The at least one door stop fitting is provided for rotation in an associated rotation plane, wherein the associated rotation plane is at least approximately parallel to the aircraft door plane.

The present invention further provides an aircraft with an aircraft fuselage structure and an aircraft cabin door, wherein at least one fuselage stop fitting is mounted to an associated aircraft fuselage structure for the aircraft cabin door. The aircraft cabin door comprises an outer skin and at least one beam that is connected to the outer skin, the outer skin and the at least one beam defining an aircraft door plane, wherein the aircraft cabin door comprises a load transfer interface with at least one door stop fitting that is provided to transfer pressure loads from the aircraft cabin door to the associated aircraft fuselage structure via the at least one fuselage stop fitting. The at least one door stop fitting is provided for rotation in an associated rotation plane, wherein the associated rotation plane is at least approximately parallel to the aircraft door plane.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
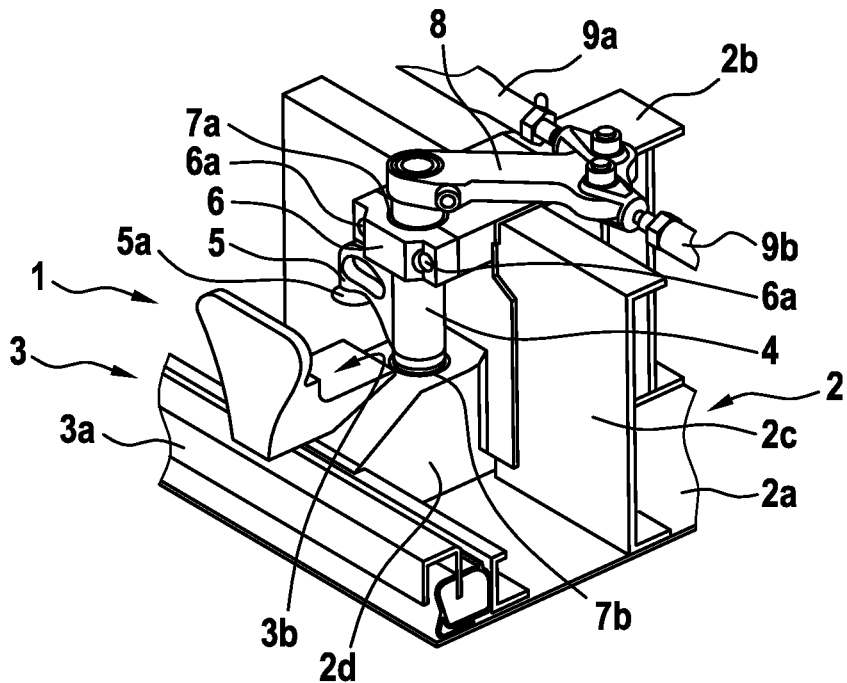
FIG. 1 shows a perspective view of a load transfer interface for a vehicle door in opened state according to the invention.

FIG. 1 shows a load transfer interface 1 for a vehicle door 2 according to the present invention, which is exemplarily illustrated in opened state. The vehicle door 2 is preferably adapted to close an associated vehicle structural frame 3 of an associated vehicle, preferentially in a fluid-tight manner. The vehicle structural frame 3 is illustratively provided with a structural frame seal striker 3a.

Figure 9:
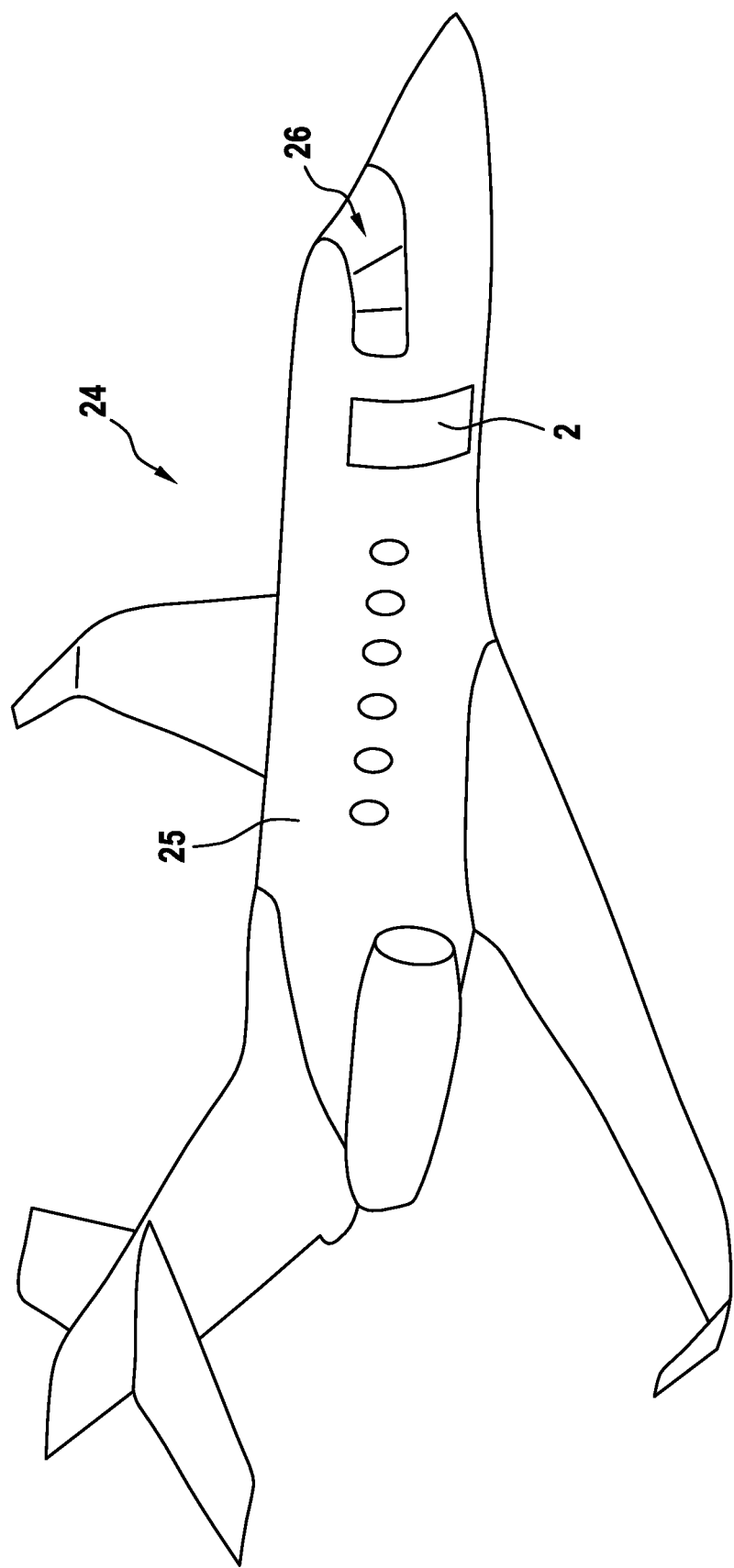
FIG. 9 shows a perspective view of an aircraft having an aircraft cabin door that is provided with at least one load transfer interface according to FIG. 1 to FIG. 7.

According to one aspect, the vehicle door 2 is an aircraft cabin door (cp. FIG. 9), the vehicle structural frame 3 is an aircraft fuselage structure (25 in FIG. 9) and the associated vehicle is an aircraft (24 in FIG. 9). However, the load transfer interface 1 can similarly be applied to various other vehicle doors, in particular vehicle doors in vessels, such as ships and so on.

Illustratively, the vehicle door 2 comprises an outer skin 2a that is preferably connected, preferentially rigidly attached, to a plurality of beams 2b and frames 2c. The plurality of beams 2b and the plurality of frames 2c are preferentially provided for transferring pressure loads applied at the outer skin 2a to the load transfer interface 1. For simplicity and clarity of the drawings, however, only a single beam and a single frame are shown and respectively referred to hereinafter as "the beam 2b" and "the frame 2c". Illustratively, the outer skin 2a and the beam 2b and/or the frame 2c define an associated vehicle door plane of the vehicle door 2, which is mounted to the associated vehicle structural frame 3.

By way of example, if the vehicle door implements an aircraft cabin door of an aircraft, the beam 2b represents a structural part in the aircrafts axial direction and the frame 2c in its circumferential direction. The beam 2b defines a major load carrying part with respective load transfer interfaces 1 at its axial ends.

According to one aspect, pressure loads between the vehicle door 2 and the associated vehicle structural frame 3 are transferred via the load transfer interface 1. Therefore, the load transfer interface 1 preferentially comprises at least one door stop fitting 5 that is provided to transfer the pressure loads from the vehicle door 2 to the associated vehicle structural frame 3. Preferably, the at least one door stop fitting 5 comprises a stopper 5a that is adapted to be pressed against an associated contra-stop fitting 3b provided on the associated vehicle structural frame 3 to which the vehicle door 2 is mountable and, exemplarily, mounted.

According to one aspect, the at least one door stop fitting 5 is provided for rotation in an associated rotation plane that is at least approximately parallel to the vehicle door plane. Therefore, the at least one door stop fitting 5 preferentially comprises a rotating arm 4.

Preferably, the rotating arm 4 is mounted to the beam 2b, which exemplarily comprises an optional longitudinal extension 2d, by means of at least one and, illustratively, two bearings 7a, 7b. Each one of the two bearings 7a, 7b is preferentially adapted to allow rotation of the rotating arm 4 around an associated rotation axis (10 in FIG. 2). By way of example, at least one and, preferentially, each one of the two bearings 7a, 7b is a slide bearing, in particular a liner bushing that is capable of allowing low friction rotation of the rotating arm 4 and at least reduced abrasion on the beam 2b.

A first bearing 7a is preferably mounted to the beam 2b by means of an associated lug bracket 6. The latter illustratively retains the first bearing 7a at the beam 2b and is preferentially detachably mounted to the beam 2b by means of at least one associated fastener 6a. A second bearing 7b is preferably accommodated in the optional longitudinal extension 2d of the beam 2b.

According to one aspect, the rotating arm 4 is connected and, more specifically, mounted in a non-rotatable manner, to at least one actuating lever 8 that is provided for rotating the rotating arm 4 between associated open and close positions. The at least one actuating lever 8 is preferably connected to associated actuating members 9a, 9b, which are preferentially implemented as actuating rods that are mounted in a rotatable manner to the at least one actuating lever 8. The actuating rods 9a, 9b are preferably actuated for rotating the at least one door stop fitting 5 from its open position, which is exemplarily illustrated in FIG. 1, into its close position, which is exemplarily illustrated in FIG. 3.

Figure 2:
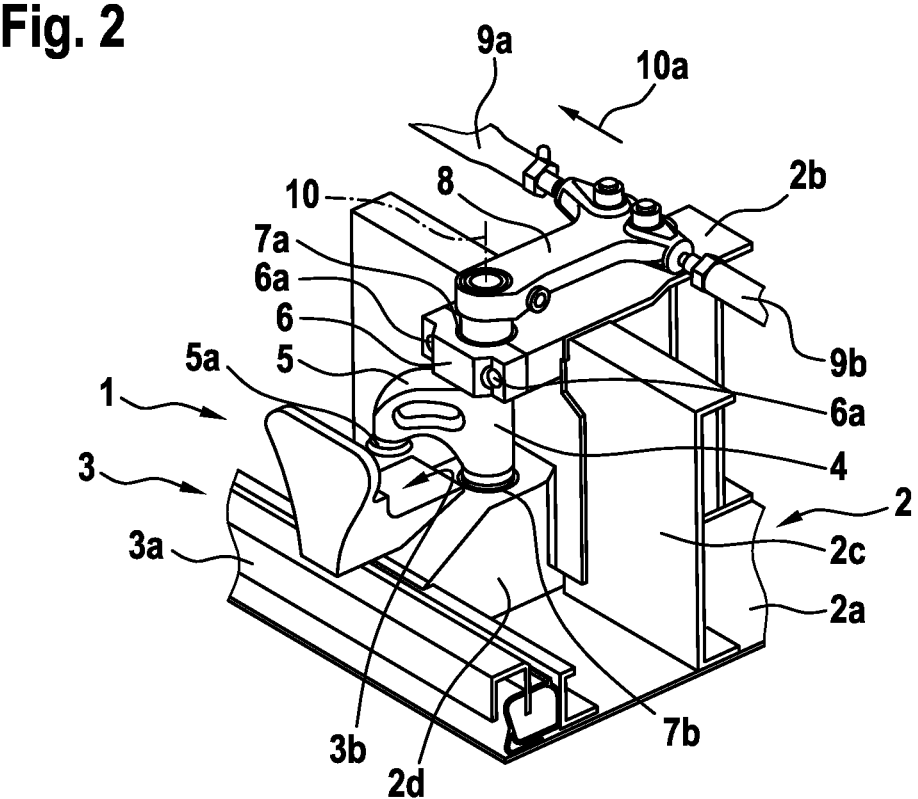
FIG. 2 shows the perspective view of the load transfer interface of FIG. 1 during closing of the vehicle door of FIG. 1.
Figure 3:
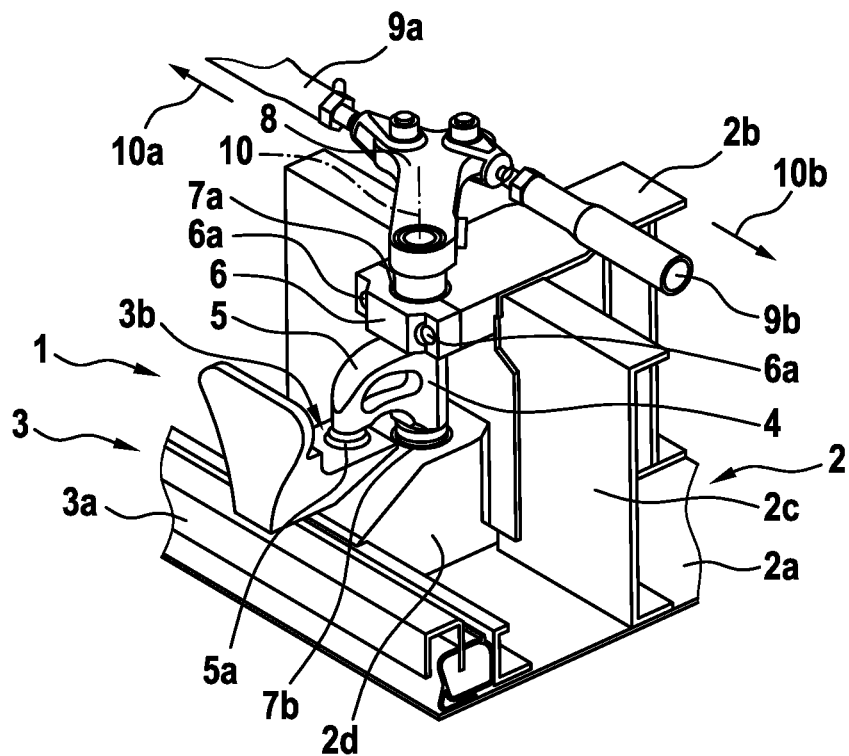
FIG. 3 shows the perspective view of the load transfer interface of FIG. 1 and FIG. 2 of the vehicle door of FIG. 1 and FIG. 2 in closed state.

FIG. 2 shows the load transfer interface 1 of FIG. 1 for the vehicle door 2 of FIG. 1, which is exemplarily illustrated in an intermediate state between its opened state according to FIG. 1 and its closed state according to FIG. 3. By way of example, the actuating rods 9a, 9b of FIG. 1 are moved into a closing actuation direction 10a, so that the at least one actuating lever 8 of FIG. 1 is rotated around a rotation axis 10 of the at least one door stop fitting 5 of FIG. 1. This rotation axis 10 is preferably defined by the rotating arm 4 of FIG. 1 and, preferentially, at least approximately perpendicular to the vehicle door plane described above with reference to FIG. 1. By rotating the at least one actuating lever 8 around the rotation axis 10, rotation of the at least one door stop fitting 5 from its open position according to FIG. 1 into its close position, which is exemplarily illustrated in FIG. 3, can illustratively be achieved.

FIG. 3 shows the load transfer interface 1 of FIG. 1 and FIG. 2 for the vehicle door 2 of FIG. 1 and FIG. 2 in its closed state. As described above with reference to FIG. 2, this closed state is obtained by moving the actuating rods 9a, 9b of FIG. 1 and FIG. 2 into the closing actuation direction 10a of FIG. 2, so that the at least one actuating lever 8 of FIG. 1 and FIG. 2 and, thus, the at least one door stop fitting 5 of FIG. 1 and FIG. 2, is rotated around the rotation axis 10 of FIG. 2 until the at least one door stop fitting 5, i. e. its stopper 5a of FIG. 1 and FIG. 2, reaches the associated contra-stop fitting 3b of FIG. 1 and FIG. 2.

If, however, the actuating rods 9a, 9b are moved into an opening actuation direction 10b, the at least one actuating lever 8 and, thus, the at least one door stop fitting 5, is rotated around the rotation axis 10 in a rotation direction that is opposed to the one described above. In this case, the at least one door stop fitting 5 is rotated from its illustrated close position via the intermediate position according to FIG. 2 into its open position according to FIG. 1.

Figure 4:
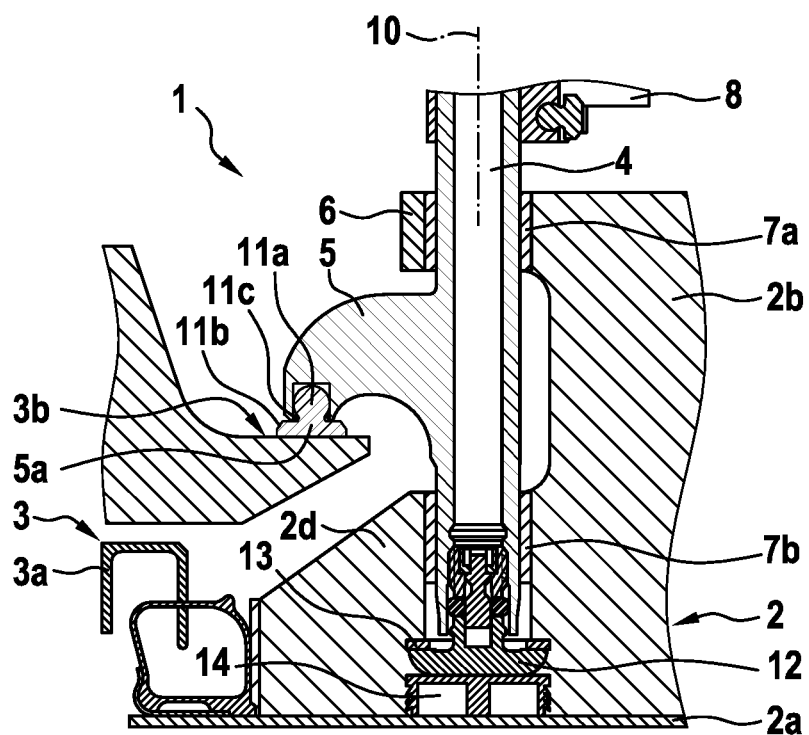
FIG. 4 shows a sectional view of the load transfer interface of FIG. 3.

FIG. 4 shows the load transfer interface 1 of FIG. 3 for the vehicle door 2 of FIG. 3 in its closed state. In FIG. 4, an exemplary rotatable bearing of the at least one door stop fitting 5 of FIG. 1 to FIG. 3, i. e. the rotating arm 4 of FIG. 1 to FIG. 3, at the beam 2b of FIG. 1 to FIG. 3 by means of the bearings 7a, 7b of FIG. 1 to FIG. 3 is further illustrated.

According to one aspect, the rotating arm 4 is provided with an adjustment member 12 that is adapted for adjusting a longitudinal extension of the rotating arm 4. The adjustment member is preferably connected to the beam 2b, i. e. its optional longitudinal extension 2d of FIG. 1 to FIG. 3, via an associated washer 13. However, the washer 13 is merely optional and its function is not mandatory for the invention, i. e. it can be considered at the adjustment member 12 itself or, alternatively, e. g. realized via a bush with shoulder.

Furthermore, a filler 14 is preferably provided for filling out space in the beam 2b, i. e. its optional longitudinal extension 2d, adjacent to the adjustment member 12. The filler 14 is preferably provided for limiting movability of the adjustment member at least in cases, wherein the load transfer interface 1 is dismounted. However, the filler 14 is merely optional and its function is not mandatory for the invention. Alternatively, a respective head of the adjustment member 12 can be dimensioned big enough to fill the according space by its own, the parts are changed such that a given/modified head of the adjustment member 12 is filling the according space or a higher clearance is accepted for positioning of the adjustment member 12.

It should be noted that the longitudinal extension 2d is characterized as being "optional", as omission thereof is possible. For instance, instead of providing such a longitudinal extension to the beam 2b, a suitable cut-out in the beam 2b can be realized for allowing arrangement of the bearings 7a, 7b.

Preferably, in the illustrated closed state a moment to the beam 2b due to interface load between the contra-stop fitting 3b provided on the associated vehicle structural frame 3 of FIG. 1 to FIG. 3 and the at least one door stop fitting 5 of FIG. 1 to FIG. 3 results in the bearing 7a to be pushed while the bearing 7b is pulled. Additionally, a respective axial load is transferred via the adjustment member 12 to the beam 2b. The adjustment member 12 is preferably used to rig a predefined stop, which is typically covered by a stop screw.

FIG. 4 also illustrates an exemplary embodiment of the stopper 5a of FIG. 1 to FIG. 3, with a ball part 11a that is connected to a disc-shaped part 11b. Preferably, the ball part 11a is accommodated in the at least one door stop fitting 5 of FIG. 1 to FIG. 3 and sealed therein by means of a suitable gasket 11c. Alternatively or additionally, the gasket 11c may be used as a reset for the disc-shaped part 11b.

Figure 5:
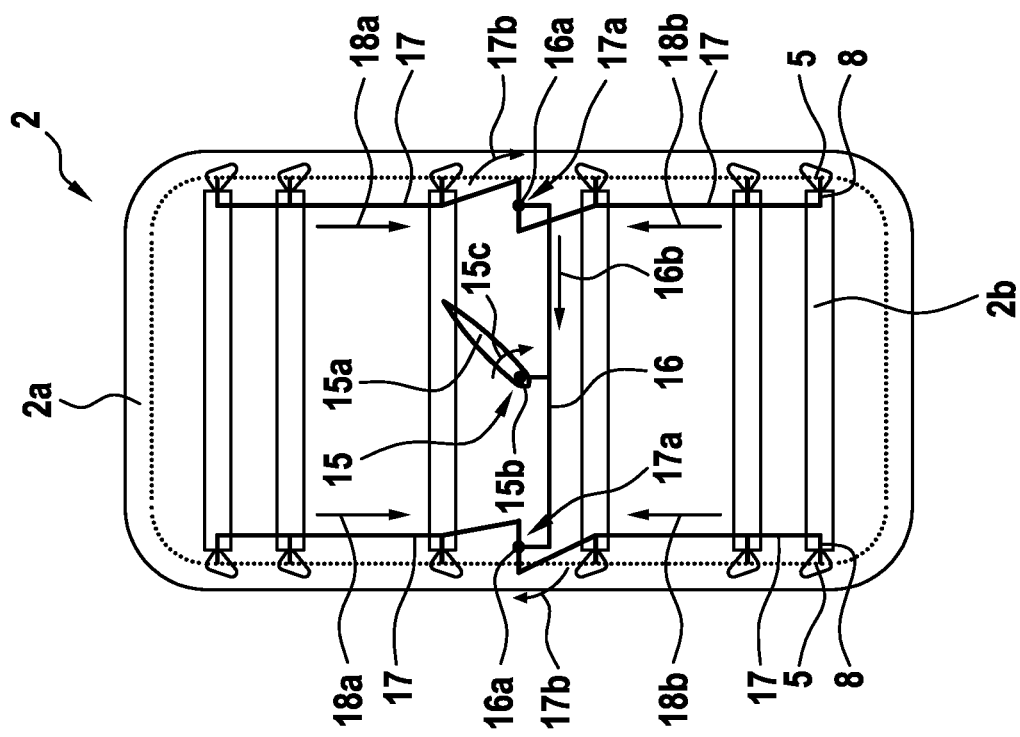
FIG. 5 shows a front view of the vehicle door of FIG. 1 with a plurality of load transfer interfaces.

FIG. 5 shows the vehicle door 2 of FIG. 1 to FIG. 4 in its opened state according to FIG. 1, for illustrating an exemplary door kinematic 15 that is preferably useable for opening and closing the vehicle door 2. By way of example, the vehicle door 2 comprises six beams 2b that are preferentially arranged in parallel and implemented according to FIG. 1 to FIG. 4, each beam 2b being provided with two separate door stop fittings 5 that are also implemented according to FIG. 1 to FIG. 4. Furthermore, each one of the door stop fittings 5 is mounted in a non-rotatable manner to an associated actuating lever 8, each being implemented according to FIG. 1 to FIG. 4, preferably by means of respective rotating arms 4 as described above with reference to FIG. 1.

According to one aspect, each actuating lever 8 is connected to at least one associated lateral linkage 17, preferentially in a rotatable manner. Illustratively, four lateral linkages 17 are provided, each being exemplarily connected to three different actuating levers 8 and, thus, to three different door stop fittings 5.

Preferably, each lateral linkage 17 is further connected via an associated linkage connector 17a to a main linkage 16, which is illustratively arranged in parallel to the beams 2b. The lateral linkages 17 and the associated linkage connectors 17a preferentially implement the actuating members, i. e. actuating rods 9a, 9b of FIG. 1 to FIG. 3. More specifically, the linkage connectors 17a are preferably connected by means of respective interlinkage rotation axes 16a to the main linkage 16, preferentially in a rotatable manner.

According to one aspect, the main linkage 16, the lateral linkages 17 and the linkage connectors 17a are implemented as mechanical linkages. These mechanical linkages are preferably actuatable via an associated handle 15a, which is preferentially connected to the main linkage 16. Preferably, the handle 15a is rotatable around a rotation axis 15b.

In operation of the door kinematic 15, i. e. for closing the vehicle door 2 that is illustrated in FIG. 5 in its opened state, the handle 15a must exemplarily be rotated in a closing rotation direction 15c around the rotation axis 15b. Thus, the main linkage 16 is preferably forced to move into an exemplary closing movement direction 16b, thereby forcing the linkage connectors 17a to rotate in a closing rotation direction 17b.

Figure 6:
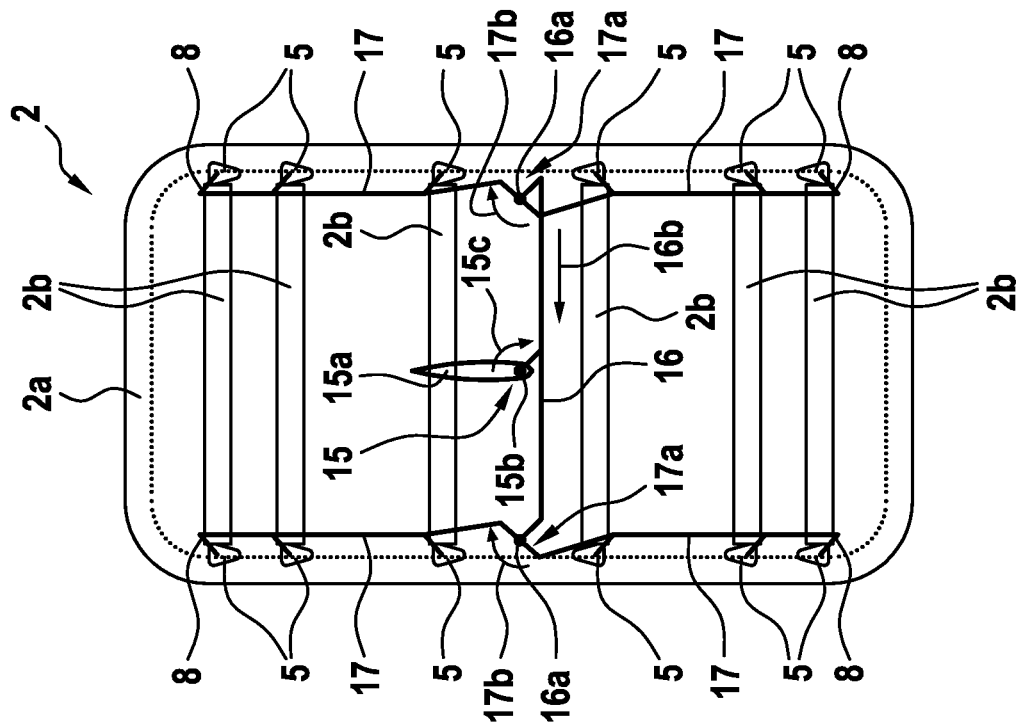
FIG. 6 shows a front view of the vehicle door of FIG. 2 with a plurality of load transfer interfaces.

FIG. 6 shows the vehicle door 2 of FIG. 5 in the intermediate state according to FIG. 2, with the exemplary door kinematic 15 of FIG. 5. According to one aspect, the rotation of the linkage connectors 17a of FIG. 5 in the closing rotation direction 17b, as illustrated in FIG. 5, results in movement of the lateral linkages 17 into exemplary closing movement directions 18a, 18b, which preferably force the door stop fittings 5 to rotate from their open position according to FIG. 5 into their respective close position, as illustrated in FIG. 7.

It should be noted that the door kinematic 15 is preferably implemented such that the—in FIG. 6—upper lateral linkages 17 move—in FIG. 6—downward in the closing movement direction 18a, while the—in FIG. 6—lower lateral linkages 17 move—in FIG. 6—upward in the closing movement direction 18b. However, such an implementation is merely exemplary and not for limiting the invention thereto. Instead, alternative implementations are readily available to the person skilled in the art, wherein e. g. the closing movement directions 18a, 18b are inverted, and so on.

Figure 7:
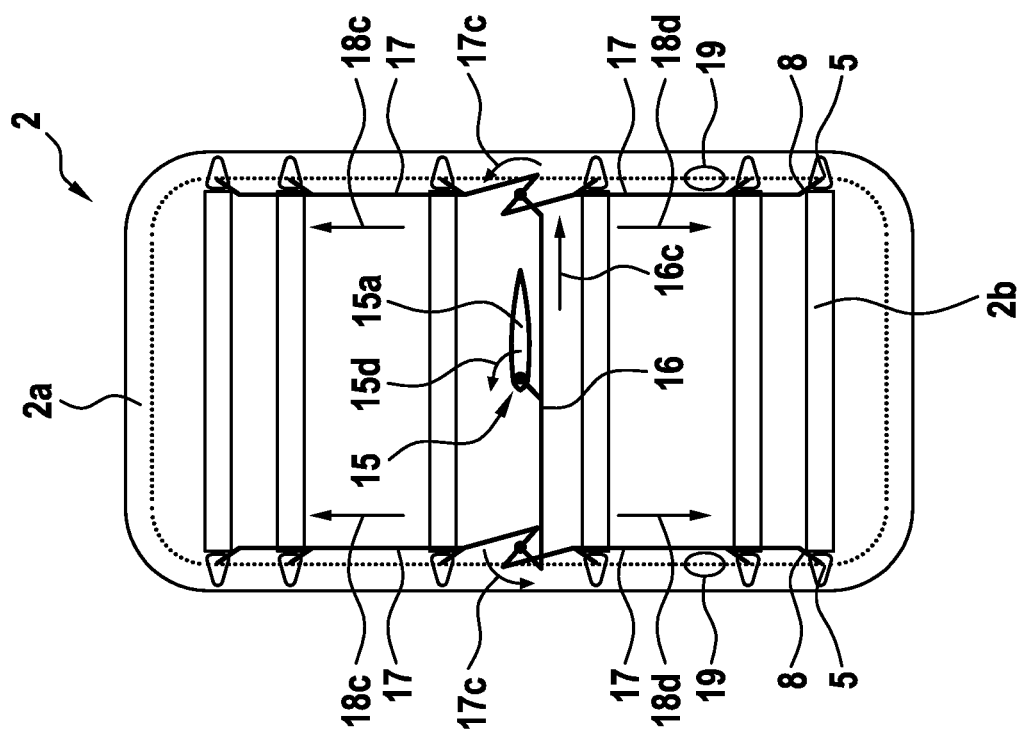
FIG. 7 shows a front view of the vehicle door of FIG. 3 with a plurality of load transfer interfaces.

FIG. 7 shows the vehicle door 2 of FIG. 5 and FIG. 6 in the closed state according to FIG. 3 and FIG. 4, with the exemplary door kinematic 15 of FIG. 5 and FIG. 6. According to one aspect, the movement of the lateral linkages 17 of FIG. 5 and FIG. 6 into the exemplary closing movement directions 18a, 18b, as illustrated in FIG. 6, results in rotation of the door stop fittings 5 from their open position according to FIG. 5 into their respective close position of FIG. 3 and FIG. 4.

For opening the vehicle door 2 that is in its closed state according to FIG. 7, the handle 15a must exemplarily be rotated in an opening rotation direction 15d around the rotation axis 15b of FIG. 5 and FIG. 6. Thus, the main linkage 16 is preferably forced to move into an exemplary opening movement direction 16c, thereby forcing the linkage connectors 17a to rotate in an opening rotation direction 17c. This rotation preferably results in movement of the lateral linkages 17 into exemplary opening movement directions 18c, 18d, which preferably force the door stop fittings 5 to rotate from their close position according to FIG. 7 via the intermediate position according to FIG. 6 into their respective open position, as illustrated in FIG. 5.

Figure 8:
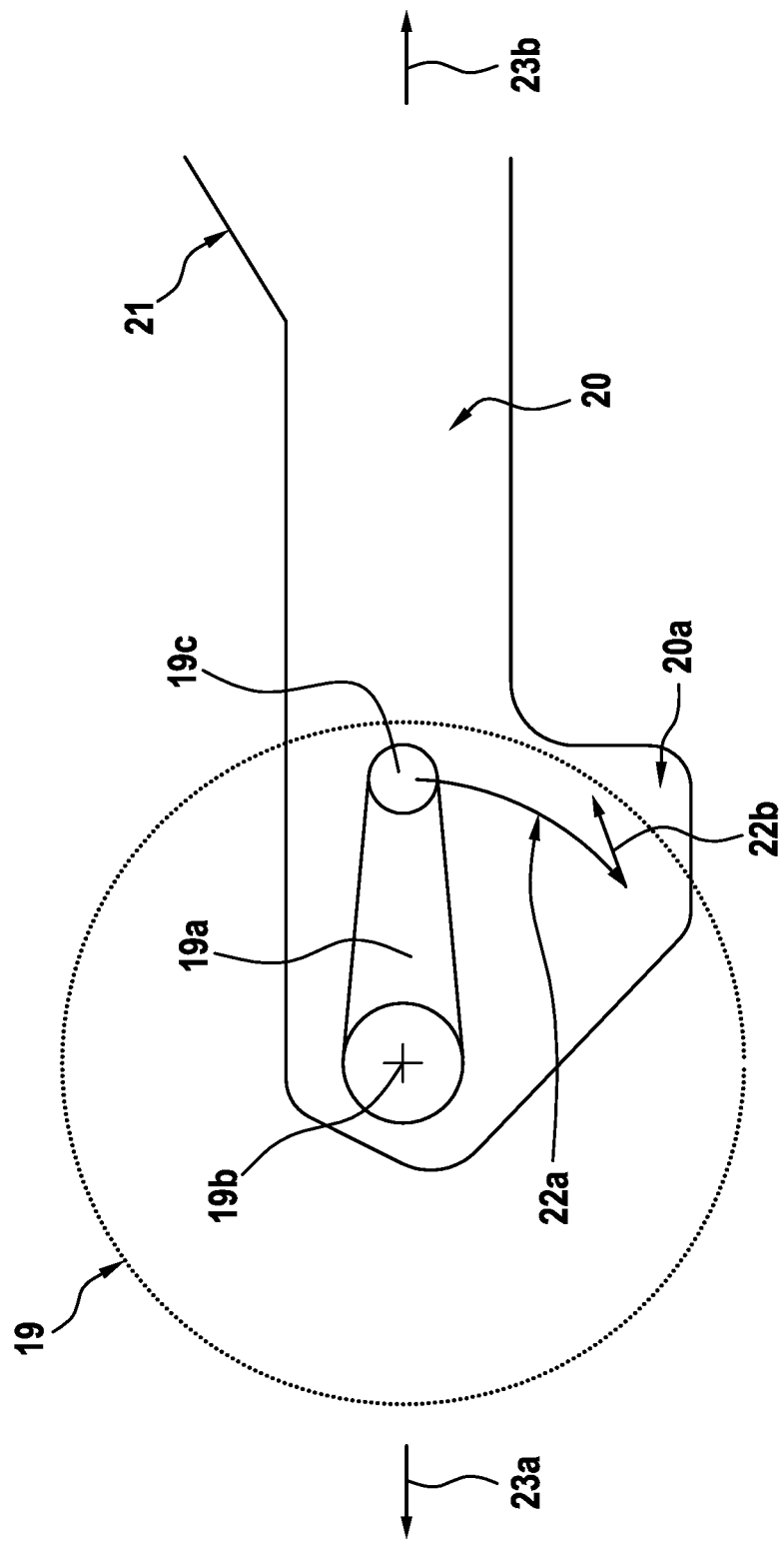
FIG. 8 shows a schematic side view of a latch/lock contour of the vehicle door of FIG. 1 to FIG. 7.

FIG. 8 shows an exemplary door-side latch/lock unit for the inventive vehicle door 2 of FIG. 1 to FIG. 7. According to one aspect, this door-side latch/lock unit comprises a latch/lock lever 19a that is rotatable around an associated rotation axis 19b, preferentially upon actuation by means of an associated handle, such as e. g. the handle 15a of FIG. 5 to FIG. 7. Preferably, the latch/lock lever 19a is provided at a free axial end with a latch/lock roller 19c.

According to one aspect, the latch/lock roller 19c is provided for rolling during an open/close movement of the inventive vehicle door 2 of FIG. 1 to FIG. 7 in an associated guide slot 20, which is preferably implemented as a bracket that is mounted to the structural frame 3 of FIG. 1 to FIG. 4. The guide slot 20 preferably comprises a blocking area 20a and defines an overcenter area 21.

In an exemplary closing of the inventive vehicle door 2 of FIG. 1 to FIG. 4, the latch/lock roller 19c preferably initially enters the guide slot 20 at the overcenter area 21 and, then, preferentially moves into an inside vehicle direction 23a. The overcenter area 21 is preferably constructed such that actuation of the associated handle, e. g. the handle 15a of FIG. 5 to FIG. 7, is enabled when the latch/lock roller 19c has passed the overcenter area 21 on its travel along the guide slot 20 into the inside vehicle direction 23a, so that rotation of the latch/lock lever 19a is enabled as described below.

According to one aspect, the latch/lock lever 19a blocks the door kinematic 15 of FIG. 5 to FIG. 7 until the latch/lock roller 19c reaches the blocking area 20a, i. e. until the inventive vehicle door 2 of FIG. 1 to FIG. 7 reaches its so-called fully moved in position. After reaching of the blocking area 20a, i. e. when the inventive vehicle door 2 of FIG. 1 to FIG. 7 has reached its so-called fully moved in position, the door kinematic 15 and, more specifically, the handle 15a of FIG. 5 to FIG. 7, can be actuated as described above, whereby the latch/lock lever 19a is rotated, preferentially into a closing rotation direction 22a, and in addition thereto the door stop fittings 5 of FIG. 5 to FIG. 7 preferably are also rotated as described above with reference to FIG. 5 to FIG. 7. Consequently, the latch/lock roller 19c moves inside of the blocking area 20a into the closing rotation direction 22a along a circular path 19.

As the so-called fully moved in position of the inventive vehicle door 2 of FIG. 1 to FIG. 7 requires a gap at the vehicle stop interface 1 of FIG. 1 to FIG. 4 for avoiding clashes during a respective closing movement of the door stop fittings 5 of FIG. 5 to FIG. 7, the inventive vehicle door 2 of FIG. 1 to FIG. 7 has to perform some outward movement at a final stage of a respective closing procedure. Therefore, the latch/lock roller 19c will perform a slight outward movement in the blocking area 20a into a movement direction 22b. The blocking area 20a is preferably dimensioned on the basis of the circular path 19 so that the latch/lock roller 19c can move into an unloaded position in the blocking area 20a.

For opening of the inventive vehicle door 2 of FIG. 1 to FIG. 4 starting from its closed state that is reached as described above, the above described procedure is performed in opposed direction with opposed movement/rotation directions. Thus, when the latch/lock lever 19a has reached the position illustrated in FIG. 8, it can be moved out of the guide slot 20 into an outside vehicle direction 23b, thereby, opening the inventive vehicle door 2 of FIG. 1 to FIG. 4.

FIG. 9 shows an aircraft 24 with an aircraft fuselage structure 25 that defines an aircraft cabin 26. Illustratively, this aircraft cabin 26 can be accessed via an aircraft cabin door, which is preferably implemented by the vehicle door 2 of FIG. 1 to FIG. 7. As described above, the vehicle door 2 and, thus, the aircraft cabin door is preferentially provided with the load transfer interface 1 described above with reference to FIG. 1 to FIG. 7.

It should be noted that modifications to the above described embodiments are within the common knowledge of the person skilled in the art and, thus, also considered as being part of the present invention.

REFERENCE LIST 1 load transfer interface
2 vehicle door
2a door outer skin
2b door beam
2c door edge frame
2d door beam extension
3 vehicle structural frame
3a structural frame seal striker
3b structural frame contra-stop fitting
4 rotating arm
4 door stop fitting
5a stopper
6 lug bracket
6a fastener
7a upper slide bearing
7b lower slide bearing
8 actuating lever
9a, 9b actuating rods
10 rotation axis
10a closing actuating direction
10b opening actuating direction
11a ball part
11b disc-shaped part
11c gasket
12 adjustment bolt
13 washer
14 filler
15 door kinematic
15a handle
15b rotation axis
15c closing rotation direction
15d opening rotation direction
16 main linkage
16a interlinkage rotation axes
16b main linkage closing movement direction
16c main linkage opening movement direction
17 lateral linkages
17a linkage connectors
17b linkage connector closing rotation direction
17c linkage connector opening rotation direction
18a upper lateral linkage closing movement direction
18b lower lateral linkage closing movement direction
18c upper lateral linkage opening movement direction
18d lower lateral linkage opening movement direction
19 door-side latch/lock unit
19a latch/lock lever
19b lever rotation axis
19c latch/lock roller
20 guide slot
20a guide slot blocking area
21 guide slot overcenter area
22a latch/lock lever closing rotation direction
22b latch/lock lever closing position movement direction
23a vehicle inside
23b vehicle outside
24 aircraft
25 aircraft fuselage structure
26 aircraft cabin

What is claimed is:

1. A load transfer interface for a pressurized vehicle door that comprises an outer skin and a plurality of beams spaced parallel and connected to the outer skin, wherein the outer skin and the plurality of beams define a vehicle door plane, each beam having at least two door stop fittings to transfer pressure loads from the vehicle door to a vehicle structural frame,
wherein the plurality of beams are arranged in parallel and the door stop fittings are rotatable in a rotation plane, substantially parallel to the vehicle door plane,
each of the door stop fittings being mounted in a non-rotatable manner to an actuating lever, each actuating lever connected by a lateral linkage to at least another of the door stop fittings of another of the beams, each lateral linkage connected to at least two door stop fittings from two different beams, each lateral linkage arranged in parallel, the lateral linkage providing mechanical linkages actuatable via a handle,
the handle being rotatable so that rotation of the handle results in movement of the lateral linkages into movement directions, which force the door stop fittings arranged in parallel to rotate.

2. The load transfer interface according to claim 1,
wherein each of the door stop fittings comprise a rotating arm that defines a rotation axis for each respective door stop fitting, the rotation axis substantially perpendicular to the vehicle door plane.

3. The load transfer interface according to claim 2,
wherein each rotating arm is mounted to at least one of the beams by at least one bearing adapted to allow rotation of the rotating arm around the rotation axis.

4. The load transfer interface according to claim 3,
wherein the at least one bearing comprises a first bearing that is mounted to at least one of the beams by a lug bracket, the lug bracket retaining the first bearing at the at least one beam.

5. The load transfer interface according to claim 4,
wherein the lug bracket is detachably mounted to the at least one beam by means of at least one fastener.

6. The load transfer interface according to claim 4,
wherein the at least one bearing comprises a second bearing that is accommodated in a longitudinal beam extension of the at least one beam.

7. The load transfer interface according to claim 4,
wherein the at least one bearing is a slide bearing.

8. The load transfer interface according to claim 2,
wherein the rotating arm is connected to at least one actuating lever that is provided for rotating the rotating arm between open and close positions.

9. The load transfer interface according to claim 8,
wherein the at least one actuating lever is connected to at least one mechanical linkage that is actuatable via a handle.

10. The load transfer interface according to claim 8, wherein the rotating arm is provided with an adjustment member that is adapted for adjusting a longitudinal extension of the rotating arm.

11. The load transfer interface according to claim 10, wherein the adjustment member is connected to the at least one beam via a washer.

12. The load transfer interface according to claim 10, wherein a filler is provided for filling out space in the at least one beam adjacent to the adjustment member.

13. The load transfer interface according to claim 1, wherein each of the door stop fittings comprise a stopper that is adapted to be pressed against a contra-stop fitting provided on the vehicle structural frame to which the vehicle door is mountable.

14. An aircraft with an aircraft fuselage structure and a pressurized aircraft cabin door mounted to the aircraft fuselage structure, wherein the aircraft comprises at least one load transfer interface, the pressurized aircraft cabin door comprises an outer skin and a plurality of beams spaced parallel and connected to the outer skin, wherein the outer skin and the plurality of beams define an aircraft cabin door plane, each beam having at least two door stop fittings to transfer pressure loads from the door to the aircraft fuselage structure, wherein the plurality of beams are arranged in parallel and the door stop fittings are rotatable in a rotation plane, substantially parallel to the vehicle door plane, each of the door stop fittings being mounted in a non-rotatable manner to an actuating lever, each actuating lever connected by a lateral linkage to at least another of the door stop fittings of another of the beams, each lateral linkage connected to at least two door stop fittings from two different beams, each lateral linkage arranged in parallel, the lateral linkage providing mechanical linkages actuatable via a handle, the handle being rotatable so that rotation of the handle results in movement of the lateral linkages into movement directions, which force the door stop fittings arranged in parallel to rotate.

15. The load transfer interface according to claim 1, wherein the load transfer interface is located on the vehicle door.

16. The load transfer interface according to claim 1, wherein the door stop fittings are mounted to the beams.

17. The load transfer interface according to claim 2, wherein each of the rotating arms is mounted to a respective one of the beams.

18. A load transfer interface for a pressurized vehicle door, the pressurized vehicle door comprising an outer skin and a plurality of beams, the beams being spaced parallel to each other and connected to the outer skin, the outer skin and the plurality of beams defining a vehicle door plane, each of the beams having two door stop fittings to transfer pressure loads from the vehicle door to a vehicle structural frame, the door stop fittings being rotatable in a rotation plane substantially parallel to the vehicle door plane, each of the door stop fittings mounted in a non-rotatable manner to an actuating lever, each actuating lever connected by a lateral linkage to at least another of the door stop fittings on another of the beams, each lateral linkage connected to spaced door stop fittings from different beams, each lateral linkage arranged in parallel, the lateral linkage providing mechanical linkages actuatable via a rotatable handle so that rotation of the handle results in movement of the lateral linkages to rotate the door stop fittings.

19. The load transfer interface according to claim 18, wherein each of the door stop fittings comprise a rotating arm that defines a rotation axis for each respective door stop fitting.

20. The load transfer interface according to claim 18, wherein each of the door stop fittings are mounted to the beams and comprise a stopper that is adapted to be pressed against an associated a contra-stop fitting provided on the vehicle structural frame to which the vehicle door is mountable.

* * * * *